(12) United States Patent
Maher et al.

(10) Patent No.: US 10,914,395 B1
(45) Date of Patent: Feb. 9, 2021

(54) LOW PROFILE SOLENOID CARTRIDGE VALVE WITH REPLACEABLE SPOOL

(71) Applicants: ZOOMLION Heavy Industry NA, Inc., Yorkville, WI (US); ZOOMLION Heavy Industry Science and Technology Co. Ltd., Changsha (CN)

(72) Inventors: Ayoub E. Maher, Chicago, IL (US); Shu Wang, Yorkville, WI (US)

(73) Assignees: ZOOMLION HEAVY INDUSTRY NA, INC., Yorkville, WI (US); ZOOMLION HEAVY INDUSTRY SCIENCE & TECHNOLOGY CO., LTD, Changsha (CN)

( * ) Notice: Subject to any disclaimer, the term of this patent is extended or adjusted under 35 U.S.C. 154(b) by 31 days.

(21) Appl. No.: 16/536,702

(22) Filed: Aug. 9, 2019

(51) Int. Cl.
| F16K 31/528 | (2006.01) |
| F16K 31/10 | (2006.01) |
| F16K 31/06 | (2006.01) |
| F16K 31/52 | (2006.01) |
| F16H 25/18 | (2006.01) |

(52) U.S. Cl.
CPC .......... F16K 31/10 (2013.01); F16K 31/0655 (2013.01); F16K 31/528 (2013.01); *F16H 25/183* (2013.01); *F16K 31/52* (2013.01)

(58) Field of Classification Search
CPC ........ F16K 31/10; F16K 31/28; F16K 31/528; F16K 31/5286; F16K 31/0655; F16K 31/52408; F16H 25/18; F16H 25/183; F16H 25/186; Y10T 74/18304; B60T 8/367

USPC .............. 251/129.02, 129.2, 251–263; 74/56
See application file for complete search history.

(56) References Cited

U.S. PATENT DOCUMENTS

| 1,819,452 A * | 8/1931 | Wright ................ F16K 31/0679 251/129.1 |
| 2,605,785 A * | 8/1952 | Ellsworth ............... F16K 11/24 251/129.2 |
| 4,790,512 A * | 12/1988 | Lindsay ................ F16K 31/105 251/129.1 |
| 2008/0210896 A1* | 9/2008 | Bohn .................. F16K 31/0655 251/129.02 |

FOREIGN PATENT DOCUMENTS

WO   WO 00/51145   8/2000

* cited by examiner

*Primary Examiner* — Matthew W Jellett
(74) *Attorney, Agent, or Firm* — Donald J. Ersler

(57) ABSTRACT

A low profile solenoid cartridge valve with replaceable spool preferably includes a valve body, a valve spool, a spool return spring, a solenoid coil, a solenoid plunger and plunger return spring. The valve body includes a spool body, a solenoid body and a threaded manifold end. A spool inner diameter is sized to receive the valve spool. The valve spool includes a chamfered neck. A plunger bore is formed through the solenoid body to receive the solenoid plunger. The solenoid coil includes a coil body and an electrical connector. A solenoid counter bore is formed in the solenoid body to receive the coil body. A chamfered slot is formed on one end of the solenoid plunger. The chamfered slot engages the chamfered neck of the valve spool and forces the valve spool upward to open a flow path in a valve manifold.

20 Claims, 4 Drawing Sheets

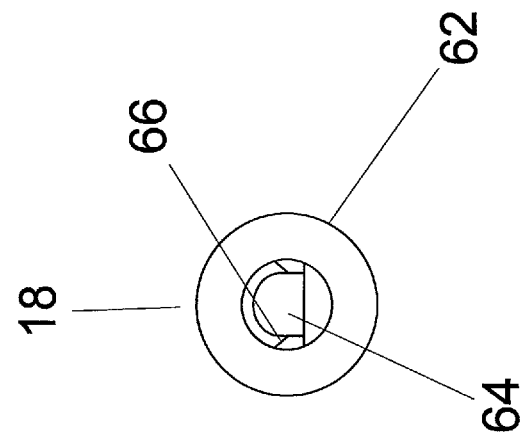
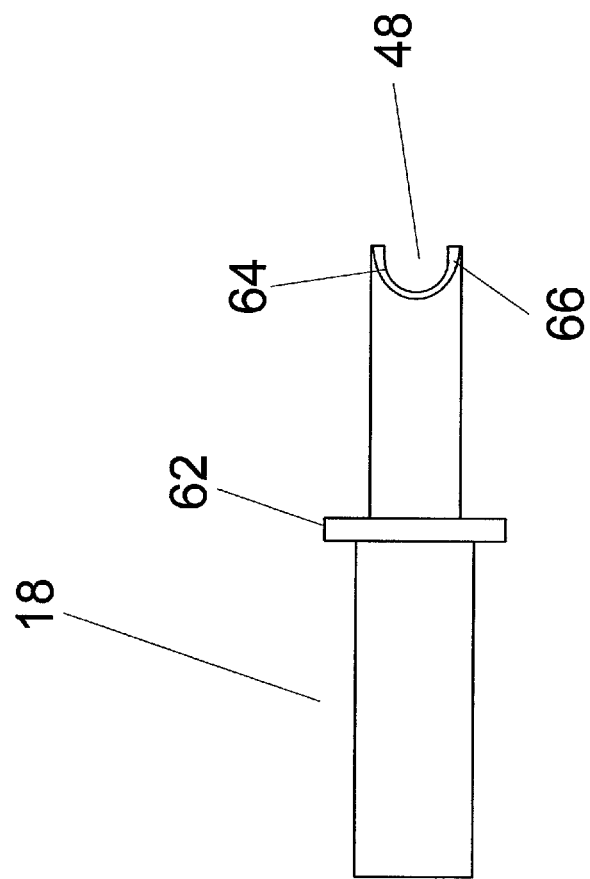
FIG. 4
FIG. 3

LOW PROFILE SOLENOID CARTRIDGE VALVE WITH REPLACEABLE SPOOL

BACKGROUND OF THE INVENTION

1. Field of the Invention

The present invention relates generally to hydraulic fluid flow and more specifically to a low profile solenoid cartridge valve with replaceable spool, which includes a solenoid coil having a horizontal lengthwise axis, which is parallel to a top surface of a valve manifold.

2. Discussion of the Prior Art

Patent no. WO 00/51145 to Schaffer discloses an electromagnet and hydraulic valve comprising such an electromagnet. Most solenoid cartridge valves have a solenoid plunger concentric with a valve spool. The inline design provides a tall solenoid cartridge valve, which is usually mounted perpendicular to a top surface of a valve manifold. The perpendicular mounting makes it very easy to break-off the solenoid valve from the valve manifold.

Accordingly, there is a clearly felt need in the art for a low profile solenoid cartridge valve with replaceable spool, which includes a solenoid coil having a horizontal lengthwise axis, which is parallel to a top surface of a valve manifold; and the solenoid coil having a lengthwise axis perpendicular to the lengthwise axis of a valve spool.

SUMMARY OF THE INVENTION

The present invention provides a low profile solenoid cartridge valve with replaceable spool, which includes a solenoid coil having a horizontal lengthwise axis, which is parallel to a top surface of a valve manifold. The low profile solenoid cartridge valve with replaceable spool (low profile valve) preferably includes a valve body, a valve spool, a spool return spring, a solenoid coil, a solenoid plunger and a plunger return spring. The valve body includes a spool body and a solenoid body. The solenoid body extends outward from an outer perimeter of the spool body. The solenoid body includes a horizontal lengthwise axis and the spool body includes a vertical lengthwise axis. A threaded manifold end is formed on a bottom of the spool body. A spool inner diameter is formed through the spool body to receive an outer diameter of the valve spool. A threaded spool boss extends from a top of the spool body, concentric with the spool inner diameter. The valve spool preferably includes a reduced spring diameter, at least one o-ring groove and a chamfered neck. The reduced spring diameter is formed on a top end to receive the spool return spring. The at least one o-ring groove is formed on an outer diameter at an opposing end to receive at least one o-ring. The chamfered neck is formed near the reduced spring diameter to receive an actuation end of the solenoid plunger. The threaded spool boss is sized to threadably receive a spool cap. The spool cap retains the spool return spring and the valve spool in a normally closed orientation.

The solenoid coil includes a coil body and an electrical connector as an integral part of the coil body. A plunger bore is formed through the solenoid body to receive the actuation end of the solenoid plunger. A spring counter bore is formed in the solenoid body to receive the plunger return spring. A solenoid counter bore is formed in the solenoid body to receive the coil body. A connector slot is formed through a wall of the solenoid body to provide clearance for a portion of the coil body. An end of the solenoid body is threaded on an open end to receive a solenoid cap. The solenoid cap retains the solenoid plunger, the solenoid coil and the plunger return spring. The solenoid plunger includes a spring flange and the actuation end. The spring flange is sized to be received by the solenoid counter bore. A chamfered slot is formed in an end of the actuation end. The chamfered slot engages the chamfered neck of the valve spool and forces the valve spool upward to open a flow path in a valve manifold.

Accordingly, it is an object of the present invention to provide a low profile valve, which includes a solenoid coil having a horizontal lengthwise axis, which is parallel to a top surface of a valve manifold; and the spool valve having a vertical lengthwise axis.

These and additional objects, advantages, features and benefits of the present invention will become apparent from the following specification.

BRIEF DESCRIPTION OF THE DRAWINGS

FIG. 3 is a top view of a solenoid plunger of a low profile valve in accordance with the present invention.

FIG. 4 is an end view of a solenoid plunger of a low profile valve in accordance with the present invention.

DETAILED DESCRIPTION OF THE PREFERRED EMBODIMENTS

Figure 1:
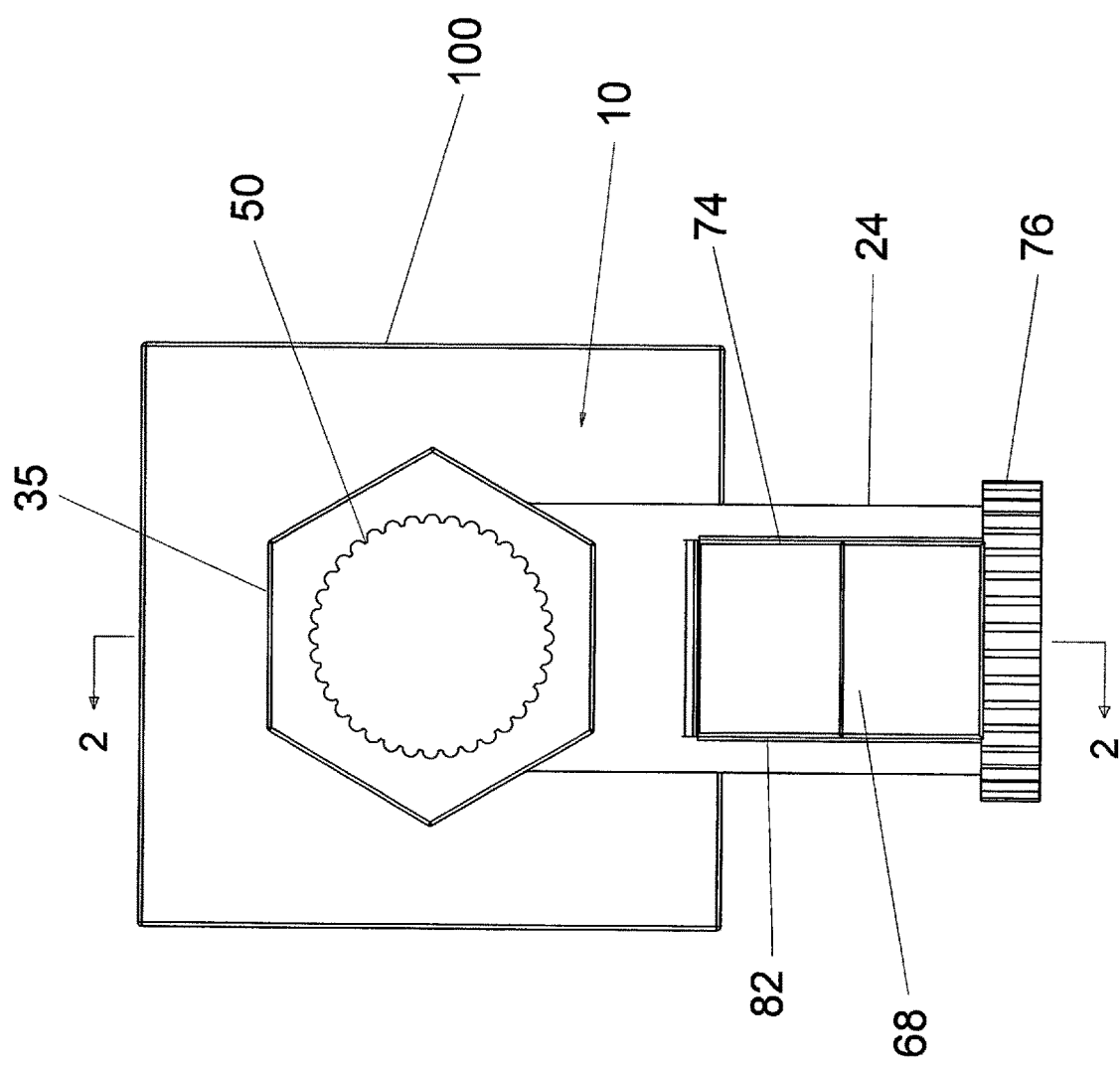
FIG. 1 is a top view of a low profile valve secured to a valve manifold in accordance with the present invention.
Figure 2:
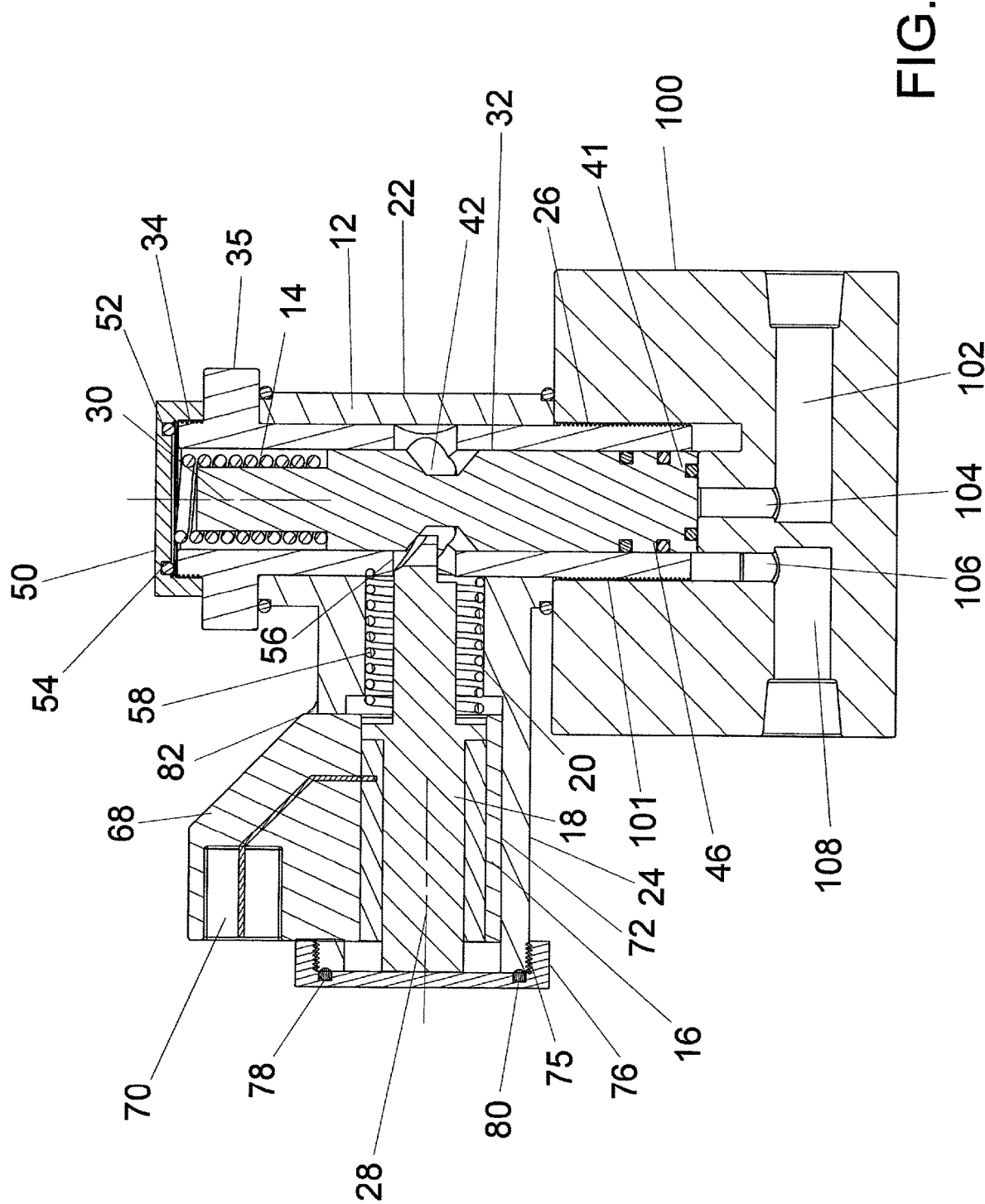
FIG. 2 is a cross sectional view of a low profile valve cut through FIG. 1 and secured to a valve manifold in accordance with the present invention.

With reference now to the drawings, and particularly to FIG. 1, there is shown a top view of a low profile valve 1. With reference to FIG. 2, the low profile valve 1 preferably includes a valve body 10, a valve spool 12, a spool return spring 14, a solenoid coil 16, a solenoid plunger 18 and a plunger return spring 20. The valve body 10 includes a spool body 22, a solenoid body 24 and a threaded manifold end 26. The spool body 22 is inserted through the solenoid body 24. The solenoid body 24 extends outward from an outer perimeter of the spool body 22. The solenoid body 24 includes a horizontal lengthwise axis 28 and the spool body 22 includes a vertical lengthwise axis 30. The threaded manifold end 26 extends from a bottom of the spool body 22. A spool inner diameter 32 is formed through the spool body 22 and the threaded manifold end 26 to receive an outer diameter of the valve spool 12. A threaded spool boss 34 extends from a top of the spool body 22, concentric with the spool inner diameter 32. A hex nut 35 or the like extends from an outer perimeter of the spool body 22 to enable the low profile valve 1 to be threaded into a spool thread 101 formed into a valve manifold 100. The valve manifold 100 includes an inlet port 102, an inlet hole 104, an outlet hole 106 and an outlet port 108.

Figure 6:
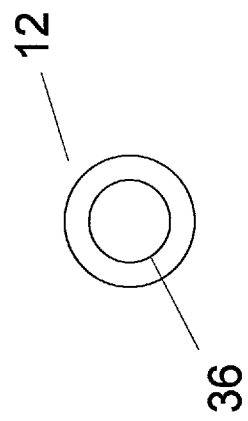
FIG. 6 is an end view of a valve spool of a low profile valve in accordance with the present invention.
Figure 7:
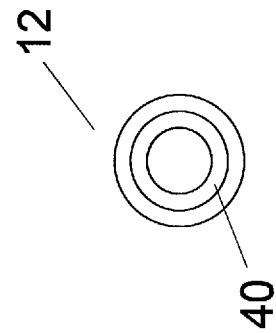
FIG. 7 is an opposing end view of a valve spool of a low profile valve in accordance with the present invention.
Figure 5:
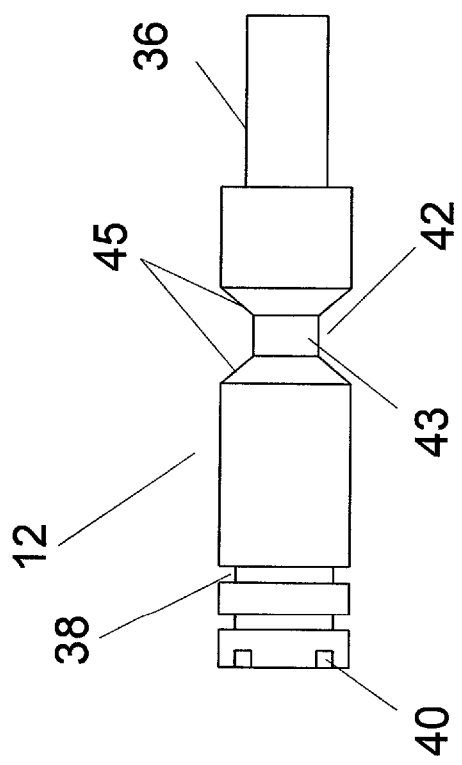
FIG. 5 is a side view of a valve spool of a low profile valve in accordance with the present invention.

With reference to FIGS. 5-7, the valve spool 12 includes a reduced spring diameter 36, at least one o-ring groove 38, a sealing o-ring groove 40 and a chamfered neck 42. The chamfered neck 42 preferably includes a neck diameter 43 and two opposing spool chamfered surfaces 45. The reduced spring diameter 36 is formed on a top end of the valve spool 12 to receive the spool compression spring 14. The at least one o-ring groove 38 is formed in an outer diameter, near an opposing end to receive at least one o-ring 46. The sealing o-ring groove 40 is formed in the opposing end of the valve spool 12 to receive a sealing o-ring 41. With reference to FIGS. 3-4, the chamfered neck 42 is formed near the reduced spring diameter 36 to receive an actuation end 48 of the solenoid plunger 18. The threaded spool boss 34 is sized to threadably receive a spool cap 50. The spool cap 50 retains the spool compression spring 14 and the valve spool 12 in a normally closed orientation. It is preferable to form a sealing o-ring groove 52 in either the spool cap 50 or the one end of the valve spool 12 to receive a sealing o-ring 54.

A plunger bore 56 is formed through the solenoid body 24 to receive the actuation end 48 of the solenoid plunger 18. A spring counter bore 58 is formed in the solenoid body 24 to receive the plunger return spring 20. The solenoid plunger 18 includes a spring flange 62. The plunger return spring 20 is retained between a bottom of the spring counter bore 58 and the spring flange 62. The actuation end includes a neck slot 64. A chamfered surface 66 is formed on a top of the neck slot 64. The neck slot is sized to receive the chamfered neck 42. The solenoid coil 16 includes an over molded coil body 68 and an electrical connector 70 as an integral part of the over molded coil body 68. A horizontal lengthwise axis 28 of the solenoid coil 16 is parallel to a plug-in axis of the electrical connector 70 of the solenoid coil 16. A solenoid counter bore 72 is formed in the solenoid body to receive the over molded coil body 68. The spring flange 62 of the solenoid plunger 18 is sized to be received by the solenoid counter bore 72. A connector slot 74 is formed through a wall of the solenoid body 24 to receive an upper portion of the over molded coil body 68. An open end of the solenoid body 24 includes threads 75 for threadably receiving a solenoid cap 76. The solenoid cap 76 retains the solenoid plunger 18, the solenoid coil 16 and the plunger return spring 20. A sealing o-ring groove 78 is preferably formed in a bottom of the solenoid cap 76 or on the open end of the solenoid body 24. The sealing o-ring groove 78 is sized to receive sealing o-ring 80. A sealant 82 is preferably applied to a perimeter of the connector slot 74 in the solenoid body 24. The solenoid plunger 18 is actuated when the solenoid coil 16 is energized, which cases the neck slot 64 of the solenoid plunger 18 to engage the chamfered neck 42 of the valve spool 12. The actuated solenoid plunger 18 forces the valve spool 12 upward to open a flow path from the inlet port 102 to the outlet port 108 in the valve manifold 100.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A low profile solenoid cartridge valve, comprising:
    a valve body includes a spool body and a solenoid body, said solenoid body extends outward from said spool body;
    a valve spool includes a chamfered neck, said valve spool is retained in said spool body;
    a solenoid coil is retained in said solenoid body; and
    a solenoid plunger includes a neck slot formed in one end, said solenoid plunger is retained in said solenoid coil, said neck slot is sized to receive said chamfered neck, a length of said neck slot of said solenoid plunger is less than an outer diameter of said valve spool, wherein said solenoid coil is energized to force said neck slot into said chamfered neck to move said valve spool to open a flow path in a valve manifold.

2. The low profile solenoid cartridge valve of claim 1, further comprising:
    a plunger compression spring for biasing said solenoid plunger to be in a retracted position relative to said valve spool.

3. The low profile solenoid cartridge valve of claim 1, further comprising:
    a solenoid cap is threadably retained on an open end of said solenoid body.

4. The low profile solenoid cartridge valve of claim 1, further comprising:
    a spool compression spring for biasing said valve spool to be in a normally closed orientation.

5. The low profile solenoid cartridge valve of claim 1, further comprising:
    a spool cap is threadably retained on a top of said spool body, said valve spool is capable of being replaced by removing said spool cap and withdrawing said valve spool.

6. The low profile solenoid cartridge valve of claim 1 wherein:
    a connector slot is formed through a wall of said solenoid body to receive a portion of said solenoid body of said solenoid coil.

7. The low profile solenoid cartridge valve of claim 1, further comprising:
    a hex nut extends from an outer perimeter of said spool body.

8. A low profile solenoid cartridge valve, comprising: a valve body includes a spool body and a solenoid body, said spool body includes a vertical lengthwise axis, said solenoid body includes a horizontal lengthwise axis, said solenoid body extends outward from a side of said spool body; a valve spool includes a chamfered neck, said valve spool is retained in said spool body; a solenoid coil is retained in said solenoid body; and a solenoid plunger includes a neck slot formed in one end, said solenoid plunger is retained in said solenoid coil, said neck slot is sized to receive said chamfered neck, a length of said neck slot of said solenoid plunger is less than an outer diameter of said valve spool, wherein said solenoid coil is energized to force said neck slot into said chamfered neck to move said valve spool to open a flow path in a valve manifold.

9. The low profile solenoid cartridge valve of claim 8, further comprising:
    a plunger compression spring for biasing said solenoid plunger to be in a retracted position relative to said valve spool.

10. The low profile solenoid cartridge valve of claim 8, further comprising:
    a solenoid cap is threadably retained on an open end of said solenoid body.

11. The low profile solenoid cartridge valve of claim 8, further comprising:
    a spool compression spring for biasing said valve spool to be in a normally closed orientation.

12. The low profile solenoid cartridge valve of claim 8, further comprising:
    a spool cap is threadably retained on a top of said spool body, said valve spool is capable of being replaced by removing said spool cap and withdrawing said valve spool.

13. The low profile solenoid cartridge valve of claim 8 wherein:
   a connector slot is formed through a wall of said solenoid body to receive a portion of said solenoid body of said solenoid coil.

14. The low profile solenoid cartridge valve of claim 8, further comprising: a hex nut extends from an outer perimeter of said spool body to enable said low profile valve to be threaded into a valve manifold.

15. A low profile solenoid cartridge valve, comprising:
   a valve body includes a spool body and a solenoid body, said solenoid body extends outward from said spool body, said spool body is inserted through said solenoid body, wherein an end of said spool body is engaged with a valve manifold to retain said solenoid body relative to the valve manifold;
   a valve spool includes a chamfered neck, said valve spool is retained in said spool body;
   a solenoid coil is retained in said solenoid body, an axis of said solenoid coil is parallel to a plug-in axis of an electrical connector of said solenoid coil, said solenoid coil lies in a horizontal plane; and
   a solenoid plunger includes a neck slot formed in one end, said solenoid plunger is retained in said solenoid coil, said neck slot is sized to receive said chamfered neck, wherein said solenoid coil is energized to force said neck slot into said chamfered neck to move said valve spool to open a flow path in said valve manifold.

16. The low profile solenoid cartridge valve of claim 15, further comprising:
   a plunger compression spring for biasing said valve plunger to be in a retracted position relative to said valve spool.

17. The low profile solenoid cartridge valve of claim 15, further comprising:
   a solenoid cap is threadably retained on an open end of said solenoid body.

18. The low profile solenoid cartridge valve of claim 15, further comprising:
   a spool compression spring for biasing said valve spool to be in a normally closed orientation.

19. The low profile solenoid cartridge valve of claim 15, further comprising:
   a spool cap is threadably retained on a top of said spool body, said valve spool is capable of being replaced by removing said spool cap and withdrawing said valve spool.

20. The low profile solenoid cartridge valve of claim 15 wherein:
   a connector slot is formed through a wall of said solenoid body to receive a portion of said solenoid body of said solenoid coil.

* * * * *